April 25, 1944. J. C. GARAND 2,347,188
MUZZLE PRESSURE INDICATOR
Filed April 2, 1942
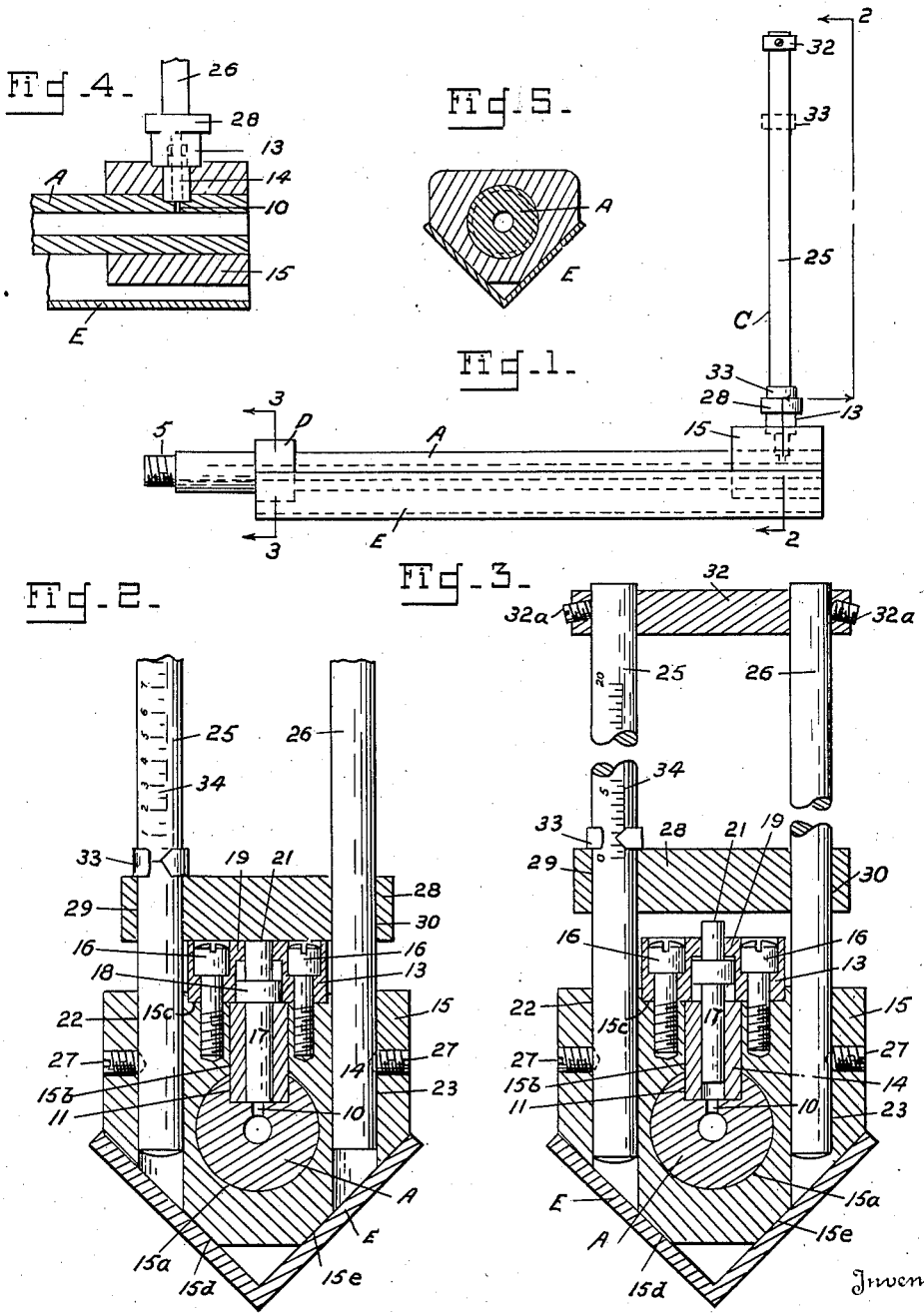
Inventor
John C. Garand
By G. J. Kessenich J. H. Church
Attorneys Patented Apr. 25, 1944

2,347,188

UNITED STATES PATENT OFFICE 2,347,188

MUZZLE PRESSURE INDICATOR

John C. Garand, Springfield, Mass.

Application April 2, 1942, Serial No. 437,369

3 Claims. (Cl. 265—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a pressure indicating apparatus particularly adapted to the measurement of the gas pressure within the barrel of a firearm.

It is an object of this invention to provide an improved apparatus for measuring or indicating a fluid pressure of large magnitude but exceedingly short duration. It is a further object of this invention to provide an apparatus for measuring or indicating the gas pressure developed in the barrel of a firearm after the discharge of a cartridge.

A particular object of this invention is to provide a compact and readily portable apparatus for indicating the relative gas pressure developed by various cartridges in a testing barrel, particularly at the muzzle end of the barrel.

Devices for measuring the gas pressure developed in firearms are known in the art, however, such devices generally utilize an apparatus wherein a deformity is produced in a soft metal by the force of the gas pressure to be measured, the extent of the deformity indicating the magnitude of the gas pressure development. Such devices have been utilized primarily for the indication of gas pressure developed at the chamber end of the barrel of the firearm. Apparently, no successful practical device has been known which provides an indication of the gas pressure at the muzzle end of the barrel of a firearm.

The measurement or indication of the gas pressure at such point presents entirely different problems than those encountered in the measurement of gas pressure at the breech end of the barrel. It can be readily appreciated that the maximum gas pressure at the muzzle end of the barrel is relatively small compared with the maximum gas pressure at the breech end. Furthermore, such pressure at the muzzle end exists for a much shorter duration of time. The duration of such pressure at the muzzle end is measured by the time of traverse of the bullet from the point of pressure measurement to the end of the barrel. In fact, in a gas actuated rifle such as disclosed in my previous U. S. Patent No. 1,892,141, the point at which it is desirable to determine the gas pressure is located approximately an inch and one-half from the end of the barrel, hence the time available for pressure measuring apparatus to operate is that time required for the bullet to traverse one and one-half inches at the end of the barrel.

Irrespective of the foregoing detrimental factors, a pressure indicating apparatus embodying the features of this invention will nevertheless produce a reliable and accurate indication of the relative gas pressures developed at the muzzle end of the barrel by various cartridges.

The specific nature of the invention as well as other objects and advantages thereof will clearly appear from a description of a preferred embodiment as shown in the accompanying drawing in which:

Fig. 1 is an external view of an assembled muzzle pressure indicator constructed in accordance with this invention.

Fig. 2 is a cross-sectional view of Fig. 1 taken along the line 2—2 prior to firing a cartridge.

Fig. 3 is a cross-sectional view of Fig. 1 taken along the line 2—2 after firing a cartridge.

Fig. 4 is a partial longitudinal sectional view of the forward portion of Fig. 1.

Fig. 5 is a cross-sectional view of Fig. 1 taken along the line 3—3.

As shown in Figure 1 in assembled relation, the pressure indicating apparatus comprises a testing barrel A, a firing mechanism (not shown), and a pressure measuring apparatus C. The barrel A is preferably provided with the same interior configuration and dimensions as the particular rifle for which it is desired to measure the pressure developed at the muzzle end. The chamber end of the testing barrel A is provided with a threaded portion 5 which engages the firing mechanism (not shown). Although any firing mechanism may conveniently be used, the receiver assembly of the U. S. rifle, caliber .30 M1903 may be conveniently utilized. Adjacent to the chamber of the testing barrel, an enlarged diameter portion D is provided which rests in a suitable supporting member such as the trough of a channel iron E.

A small porthole 10 is provided near the end of the testing barrel at the point where it is desired to obtain an indication of the gas pressure developed. This porthole 10 will bypass a portion of the gas developed in the cartridge discharge during the time that the bullet is traversing the distance from the porthole to the end of the barrel. If the location and dimension of the porthole 10 are made identical with the location and dimension of the gas port of the rifle disclosed in my U. S. Patent No. 1,892,141, it is apparent that the gas pressure indications obtained by this apparatus will closely approximate the pressure developed in that rifle by similar cartridges. The gas port 10 connects directly with a larger cylindrical chamber 11 also provided in barrel A.

A base member 15 of the measuring apparatus C is provided with a cylindrical opening 15a by which it is mounted on barrel A in the vicinity of the gas port 10. The base member 15 is provided with two opposed angular side surfaces 15d and 15e. These surfaces each lie within planes that are mutually perpendicular and which also are tangent to the surface of the enlarged diameter portion D of the barrel. With this configuration, the entire apparatus is readily supported by laying it in the trough of a length of angle iron E. The base member 15 and the enlarged diameter portion D are not secured to the angle iron E in order to permit the entire apparatus to be slidably moved into any desired position within the trough thereof.

A cylindrical opening 15b is provided in the base 15 of the same dimension as, and in direct alignment with, the chamber 11 in the barrel. A hollow cylindrical member 14 is fitted into opening 15b and chamber 11 thus anchoring the base 15 with respect to the barrel A. The interior surface of the member 14 defines a smooth bore overlying the gas port 10.

A longitudinal piston member 17 is arranged to reciprocate in the cylindrical bore of the member 14. The piston member 17 is of greater length than the cylindrical member 14. On the extending part of piston member 17 an increased diameter band 18 is provided. A hollow cylindrical fitting 13 is provided which surrounds the extending portions of the piston member 17. The lower surface of the fitting 13 is seated in a recess 15c provided in the base member 15. In this position the base of fitting 13 engages the top of the cylinder member 14 and prevents the withdrawal of the member 14 from the opening 15b and the chamber 11. The fitting 13 is securely fastened to base 15 by screws 16. Fitting 13 is further provided with inwardly extended portion 19 which not only limits the upward movement of piston member 17 through engagement with the top shoulder of band 18 but also serves to vertically guide the movement of the piston member 17 by snugly engaging the end of the piston member. The downward movement of the piston member 17 is limited by engagement of the bottom shoulder of band 18 with the top of cylindrical member 14. The piston member 17 should be made of a very hard metal or by other means provided with an extremely hard metallic top surface 21. The dimension of the piston member is such relative to the fitting 13 that when the piston member 17 is at its lowermost position, its top surface 21 is coplanar with the top surface of the fitting 13.

The base member 15 also serves to support two vertically extending slide members 25 and 26. These members are of circular cross-section and are fitted into holes 22 and 23 respectively in base member 15. Set screws 27 serve to anchor the slide members to the base.

A weight member 28 is arranged to freely vertically slide on members 25 and 26 by engagement of these members in the circular holes 29 and 30 therein. The weight member is preferably composed of a very hard metal and its lower surface contacts the hard top surface 21 of the piston member 17 when the weight 28 is in its lowermost position. Alternately, an insert of hard metal may be provided within the weight member 28 so as to contact the top surface 21 of piston member 17. The upward movement of the weight member 28 is limited by a plate 32 which is secured to the top of slide members 25 and 26 by set screws 32a.

A light wire ring 33 is slipped over either one of the slide members above the weight 28. This ring snugly and frictionally engages the slide member 25 or 26 so that it will maintain itself at any position on the slide member 25 or 26 to which it may be raised by movement of the weight member 28.

To operate the pressure indicating apparatus, the weight member 28 is lowered on the slides 25 and 26 so that it is resting upon the hardened top surface 21 of piston member 17 and the ring 33 is lowered to rest on the weight. A cartridge is then fired through the barrel A in a conventional manner by the elements of the firing mechanism (not shown). When the projectile has passed the port 10, the exploded gases enter the port and contact the bottom surface of piston member 17. The piston member will thus receive a large impact force by the action of the gas. This force, however, will exist only during the time that the projectile is traversing the distance between the port 10 and the end of the barrel.

The impact force received by the piston 17 is transmitted to the weight member 28 through the coaction of the hardened piston surface 21 with the hardened base of the weight. By the use of such hardened surfaces, the elastic energy losses will be kept at a minimum. The impact causes the member 28 to rise upward on the slide members 25 and 26 carrying with it the ring 33. The sliding surfaces are suitably lubricated to keep frictional losses at a minimum. The energy imparted to the weight member is transformed in the vertical rise of the weight member whereafter it falls back to its initial position. However, the ring 33 remains in its maximum height position on the slide member and thus serves to indicate the maximum height reached by the weight member 28. Graduations 34 may be provided on the slide member 25 or 26 to conveniently measure the height reached by the ring 33.

Knowing the mass of weight member 28, the maximum height which it reached and the time during which the gas pressure forces were acting, the magnitude of the average gas pressure may be determined by conventional mathematical methods. It is possible to graduate the height reached by the ring 33 in terms of pressure developed by the gas. Even without calibration of the height reached by the ring and hence by weight member 28, the device provides a very convenient arrangement for determining relative pressure developed by different cartridges fired through the testing barrel A. The various heights reached by the ring 33 would indicate the relative pressures developed by the various cartridges since all other factors in the apparatus are substantially constant.

The embodiment of my invention as heretofore described operates very satisfactorily in the measurement of pressures of the magnitude encountered near the end of the muzzle. If it is desired to measure the higher pressures existing in the barrel in the regions near the chamber, it is possible to do so merely by increasing the size of the weight member 28 so as to keep its upward movement within the limits of the slide members and/or by making the slide members longer.

I claim:

1. A device for measurement of short duration gas pressures comprising a cylinder arranged to receive a portion of such gas, a piston mounted in said cylinder, a weight mounted for movement independently of said piston, said weight arranged to lie against said piston and arranged to be struck an impact blow by said piston acting under the force of said gas and means for indicating the extent of movement of said weight after said impact.

2. A device for measurement of short duration gas pressures comprising a cylinder arranged to receive a portion of such gas, a piston mounted in said cylinder, a weight mounted for vertical movement independent of said piston, said weight arranged to lie against said piston and to be struck an upward impact blow by said piston acting under the force of such gas and means for indicating the height reached by said weight after said impact.

3. A device for measurement of gas pressure developed by a firearm cartridge within a barrel comprising a base member arranged to surround the barrel, vertical guide members mounted in the base member, a weight mounted for vertical movement on the guide members, a cylinder chamber in the base member means arranged to supply a portion of the gases developed within the barrel to said cylinder chamber, a piston mounted in said cylinder chamber and arranged to abut the base of said weight whereby energy imparted to said piston by the gas is transmitted by impact to the weight, raising it a measurable distance, and means for indicating the maximum height reached by said weight.

JOHN C. GARAND.